(12) United States Patent
Lain et al.

(10) Patent No.: US 7,415,113 B2
(45) Date of Patent: Aug. 19, 2008

(54) MANAGEMENT OF SECURITY KEY DISTRIBUTION

(75) Inventors: Antonio Lain, Bristol (GB); Richard Taylor, Bristol (GB); Christopher Tofts, Bristol (GB)

(73) Assignee: Hewlett-Packard Development Company, L.P., Houston, TX (US)

( * ) Notice: Subject to any disclaimer, the term of this patent is extended or adjusted under 35 U.S.C. 154(b) by 831 days.

(21) Appl. No.: 10/629,599

(22) Filed: Jul. 30, 2003

(65) Prior Publication Data

US 2004/0086125 A1 May 6, 2004

(30) Foreign Application Priority Data

Oct. 31, 2002 (GB) .................................. 0225413.4

(51) Int. Cl.
*H04L 9/00* (2006.01)
(52) U.S. Cl. .......................................... 380/278; 726/21
(58) Field of Classification Search ................. 380/278; 705/71; 726/21
See application file for complete search history.

(56) References Cited

U.S. PATENT DOCUMENTS

| | | | | |
|---|---|---|---|---|
| 5,457,746 A * | 10/1995 | Dolphin | ........................ | 705/51 |
| 6,236,971 B1 * | 5/2001 | Stefik et al. | ..................... | 705/1 |
| 6,301,658 B1 | 10/2001 | Koehler | | |
| 6,397,329 B1 * | 5/2002 | Aiello et al. | ................. | 713/155 |
| 6,658,401 B2 * | 12/2003 | Utsumi et al. | .................. | 707/1 |
| 7,124,114 B1 * | 10/2006 | Hollar | .......................... | 705/51 |
| 2002/0031230 A1 * | 3/2002 | Sweet et al. | ................. | 380/278 |

FOREIGN PATENT DOCUMENTS

| | | |
|---|---|---|
| EP | 1 235 381 A1 | 8/2002 |
| EP | 1 282 262 A1 | 2/2003 |
| GB | 2 329 497 A | 3/1999 |
| GB | 2 355 905 A | 5/2001 |
| GB | 2 377 057 A | 12/2002 |
| JP | 2000-286840 A | 10/2000 |
| WO | WO 01/25882 A1 | 4/2001 |
| WO | 01/76133 A1 | 10/2001 |
| WO | 02/078419 A2 | 10/2002 |

OTHER PUBLICATIONS

Tu et al., "On Key Distribution Management For Conditional Access System On Pay-TV System", *IEEE Transactions on consumer Electronics*, Feb. 1999, pp. 151-158, vol. 45, No. 1, IEEE.

Wallner et al., "Key Management for Multicast: Issues and Architectures" [online], 1999, IETF, available from: http://www.ietf.org/rfc/rfc2627.txt [accessed Jun. 8, 2005].

* cited by examiner

*Primary Examiner*—Gilberto Barron
*Assistant Examiner*—Kristin D Sandoval

(57) ABSTRACT

Security keys for the provision of a secure service such as content provision are generated in an ancestral hierarchy, so that invalidation of a key in the hierarchy results in a need to reconfigure all other keys in the hierarchy to the extent they share common ancestry. When a user subscription to the service lapses, a decision on invalidation of their key is based in a determination of whether it's more costly to the subscriber to invalidate the key, or continue providing an unpaid-for service. Keys can be allocated to users from domains of the hierarchy on the basis of their economic value to the provider, with higher value users being allocated keys from domains which share fewer common ancestors with other users of other domains than those users share with each other, to minimize inconvenience to high value users of key reconfiguration.

20 Claims, 3 Drawing Sheets

MANAGEMENT OF SECURITY KEY DISTRIBUTION

The present invention relates to the management of security key distribution, most typically within a community of anonymous users all of whom are sharing a secure service, which may be the provision of content or the provision of a resource for example.

One example of such a situation is one in which a large number of anonymous users subscribe to a service providing shared content which is updated on a regular basis. To protect the interests of the provider of the content such content is usually distributed to bona fide users (also known herein as "subscribers")in an encrypted form. This prevents non-subscribers from gaining access to the content and thereby diminishing its financial value to existing subscribers, and thus ultimately the pecuniary advantage that may be obtained by the provider. In one example each subscriber is given a key which they may use to decrypt content; to protect the interests of subscribers, such a key should ideally neither identify them nor enable such identification. However, it has long been established that managing the provision and maintenance of security keys to a large group of anonymous subscribers is difficult. For example, one way in which both the anonymity of the subscribers may be preserved and the provision of keys may be made simple is to give each user the same security key, however this has negative implications on the security offered by such a single key. In an alternative key management method, each user is issued with a key which is unique, at least within the provider of the content, but which does not identify the subscriber, and which functions to decrypt only content sent to that subscriber. In such a scenario, upon lapsing of the subscription, it is possible to invalidate this unique key by ceasing to make content available in a form which is decryptable using the key issued to the now-lapsed subscriber. However owing to the manner in which such keys are generated in the vast majority of instances, the revocation of even such unique keys from lapsed subscribers requires a reconfiguration of all other subscriber's keys, at least to some extent, and eventually, when sufficient keys have been invalidated, the need to reissue keys in their entirety to all subscribers.

A first aspect of the present invention relates to the revocation of unique keys from lapsed subscribers, and more particularly the basis upon which it is decided to revoke such keys. According to a first aspect of the present invention there is provided a method of managing security keys provided to users of a service comprising the steps of:

issuing a security key to a first user eligible to receive the service;

monitoring the first user's status to establish whether the first user is eligible to receive the service;

establishing, in accordance with a policy, a first value associated with invalidation of the first user's key, and a second value associated with providing the service to an ineligible user, and if the second value exceeds the first value, invalidating the key.

In a preferred embodiment the policy is based on economic grounds, so that instead of invalidating a key simply on a contractual basis because a subscription has lapsed for example, the cost to the provider of doing so is assessed, and invalidation takes place at an optimised instant in time from the point of view of the provider. Accordingly the first value preferably represents the cost to the provider of invalidating a key, and the second value represents the cost of providing the service to an ineligible user. The first value may typically include what may be thought of as consequential costs, including one or more of: the cost to the provider of disrupting the provision of the service as a result of having to reconfigure all the other issued keys to some extent, and the likelihood that the invalidation of a key will trigger the need to reissue all keys in their entirety.

The second value preferably takes into account aggregated costs of providing network capacity and server capacity to all currently ineligible users, and the economic effects of dilution of value of the service to remaining users, such as for example any consequentially increased tendency to pay subscriptions late, for example.

Frequently different levels of service are offered, and under different commercial terms, such as length of a subscription paid for in advance (and privileges associated with that for example). A second and independent aspect of the present invention relates to an appreciation of the fact that, where security keys are generated in a structured manner, such as a hierarchy for example, it may be advantageous to take into account user characteristics, and to allocate keys from the hierarchy on the basis of such characteristic.

According to a second aspect of the present invention, there is provided a method of managing security keys generated from an ancestral hierarchy and used to provide selective access to provision of a service, wherein invalidation of a key necessitates reconfiguration of each other key within the hierarchy to the extent another key and an invalidated key share common ancestry, the method comprising the steps of:

defining, upon the basis of a predetermined policy, at least two groups of users of the service to whom keys have been issued;

allocating within the hierarchy a distinct domain for each group of users; and issuing keys to users from domains within the hierarchy upon the basis of their grouping.

According to one embodiment, a group of users who have contracted to a high level of service and are therefore perceived to be valuable to the provider are allocated keys from a first domain within the hierarchy, an important characteristic of which is that keys from the first domain share fewer ancestors with keys from other domains of the hierarchy than those other keys share with each other. Consequently, when a key is invalidated from a domain other than the first domain, the keys of users from the first group require less reconfiguration than the keys from any other domain, so that the most valuable users are inconvenienced the least.

Embodiments of the present invention will now be described, by way of example, and with reference to the accompanying drawings, in which.

Figure 1:
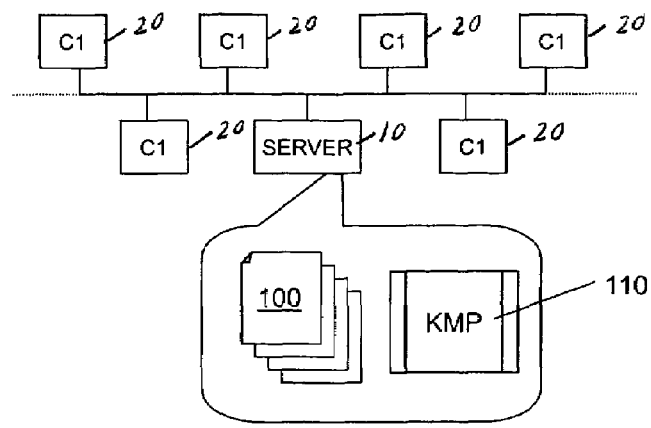
FIG. 1 is a schematic illustration of a network in which a secure resource is to be provided to subscribers.

Referring now to FIG. 1, a service is provided by a server computing entity 10 to a plurality of subscribers 20, who in the present example are in a client (computing entity) relationship with the server 10. It should be noted that the present invention is applicable without limitation to the nature of the relationship between the provider of the resource and the subscribers to its provision, and may thus for example find application in virtually any other architecture and/or relationship, such as peer to peer networks. The present illustrated architecture and relationship has been chosen merely for simplicity of illustration of the principles underlying the present invention. In the example of FIG. 1 the resource provided to subscribers is content 100 in documentary form, stored on the server 10. However, once again the present invention is equally applicable to the provision of any resource which is of value to subscribers.

To protect the economic value of the content the provider prohibits assimilation thereof by persons who are not in possession of a key, while issuing such a key to each subscriber. The prohibition may operate at any one (or more) of the stages of a process which includes the steps of: retrieving the content from the server via the network; saving the content on a subscriber's client machine; and consuming the content (e.g. in the case of visually assimilable content, reading it). The general examples given above are applicable to the provision of a resource in the form of content; in the case of the provision of some other resource, for example the use of a particular hardware element on the server machine, the prohibition is likely to operate in a somewhat different manner. Allocation and management of keys is performed at the server by a key management program KMP The precise manner of operation of both prohibition upon the availability of a resource, and use of a key to provide exception to such prohibition are not germane to the present invention, and will not therefore be discussed in any detail. More complete information may however be obtained from "Key Management for Multicast: Issues and Architectures; D. Wallner, E. Hardner & R. Agee, available online at:

http://www.ietf.org/rfc/rfc2627.txt the contents of which are hereby incorporated by reference.

Technical issues which must be taken into account in management of the provision of keys to subscribers result not merely from solely technical considerations; commercial considerations similarly give rise to technical issues. One such commercial consideration is the desire of many subscribers to remain anonymous. There are many possible reasons for this. For example, where the resource is content, the nature of the content may be such that there is a degree of moral opprobrium associated with persons consuming it, such as for example sexually explicit material. Alternatively, there may be commercial reasons for wishing to remain anonymous, for example where a subscriber to the content is a commercial undertaking, knowledge of the nature of the content to which they are subscribing may provide competitors with useful information regarding their operations or future intentions. It is therefore necessary in such a situation for the key which is distributed to each subscriber to be intrinsically incapable of identifying the subscriber. A further commercial consideration is the frequent commercial need to provide for differing levels of subscription, corresponding to different levels of content provision, or different levels of service associated with such content provision. For example "Gold" users of an online news service are able to gain access to web pages which are updated every hour, whereas "Bronze" users can only access pages which are updated once per day. Preferably therefore, the key structure should enable a provider who offers differing levels of service to reflect these service levels in any key management activities.

Figure 2:
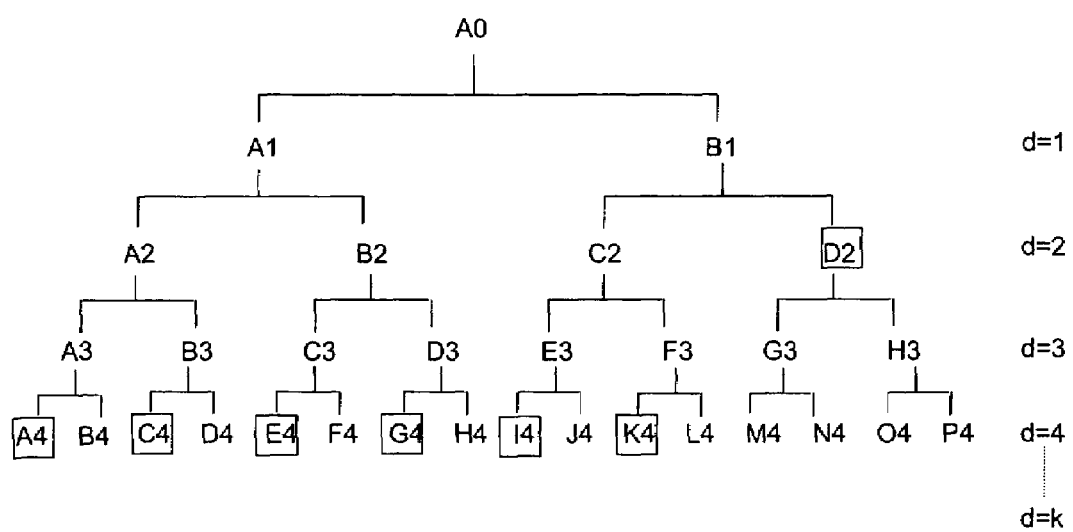
FIG. 2 is a schematic illustration of an ancestral hierarchy of security keys for securing the provision of a service.

One method in which encryption keys may be generated is illustrated in highly abstracted and simplified form in FIG. 2. In this example, encryption keys are generated in an ancestral hierarchy, which here has the form of a binary tree, although neither the binary nature of the tree, nor the tree-like architecture is essential. Features of such a key structure which are relevant to an understanding of the present invention are:

1. Each key may be used to generate two further keys, so that ultimately all keys in the tree are related to an end or root key A0.
2. Due to the binary nature of the tree, the size (e.g. in terms of the numbers of characters) of the keys in a given generation d is twice that of the keys in its parent generation d−1.
3. Each key will intrinsically indicate its provenance within the tree in the form of a path down to that key from the root key.
4. Issue of a key in a given generation d to a subscriber compromises the security provided by any keys directly related to the issued key lower down the hierarchy, thus rendering all directly descended keys in generations (d+n), where n is an integer, redundant.
5. Use of a key located at a generation d within the tree implicitly includes the use of all keys of higher generations within the tree on a path down from the root key.
6. Invalidation of any key requires reconfiguration of all other keys in the hierarchy to the extent that they share common ancestry.

A number of consequences flow from these characteristics. Firstly, and most obviously, the root A0 cannot ever be issued to a subscriber, since this would compromise the security provided by all of the other keys in the hierarchy. Secondly, and following on from this, the higher the generation of a given key, the more costly it is to issue that key to a subscriber in terms of the number of lower generation keys which are compromised as a result and are therefore redundant within the hierarchy—either for use as issued keys to subscribers or for generating descendent keys (since any descendent keys would likewise be compromised). Thirdly, the length of the key will indicate to its provenance in terms of generation within the hierarchy.

In the tree of FIG. 2 a total of only four generations have been illustrated. In practice a tree of this type is likely to have many more than four generations in total, with the total number of generations being denoted by a variable k, giving, for a binary tree a total of $2^1+2^2+\ldots 2^k$ keys, although not all of these can be allocated because of the characteristic referred to at (4) above. In the example of FIG. 2, a square around the identifier for a key is indicative of the fact that that key has been allocated to a subscriber. Thus the key D2 has been allocated to a subscriber, which has the consequence that keys G3, H3 and M4 to P4—a total of six keys in a tree with only four generations—are unuseable as a result. In fact, were a key of such an elevated generation be allocated in a practical size of tree the effect on the number of "lost" keys would be very large indeed, equal to approximately a quarter of the total keys (since the allocated key is in the second generation containing only four keys), and so it is unlikely that in practice such a key would be allocated. Because of the nature of the keys and their generation, the use of any key within the tree implicitly incorporates the use of all keys of higher generations on a path up to the root key. Thus, as the generations of the tree are descended, keys of lower generations will tend to share more common ancestor keys of higher generations, and this has implications both for the level of security offered by the use of such keys in that they are easier to break, and also for their invalidation, since this will have ramifications on the security provided by still-active keys sharing the same higher-generation ancestors. Thus allocation of a relatively high generation key does have advantages, in that its invalidation causes ramifications for fewer peer generation keys, and the key is short, meaning that it is easy to transmit and store (which takes place on the subscriber's machine). Conversely, a further disadvantage related to the use of keys from lower generations within the tree is that these keys become increasingly large and unwieldy with increasing generations.

Figure 3:
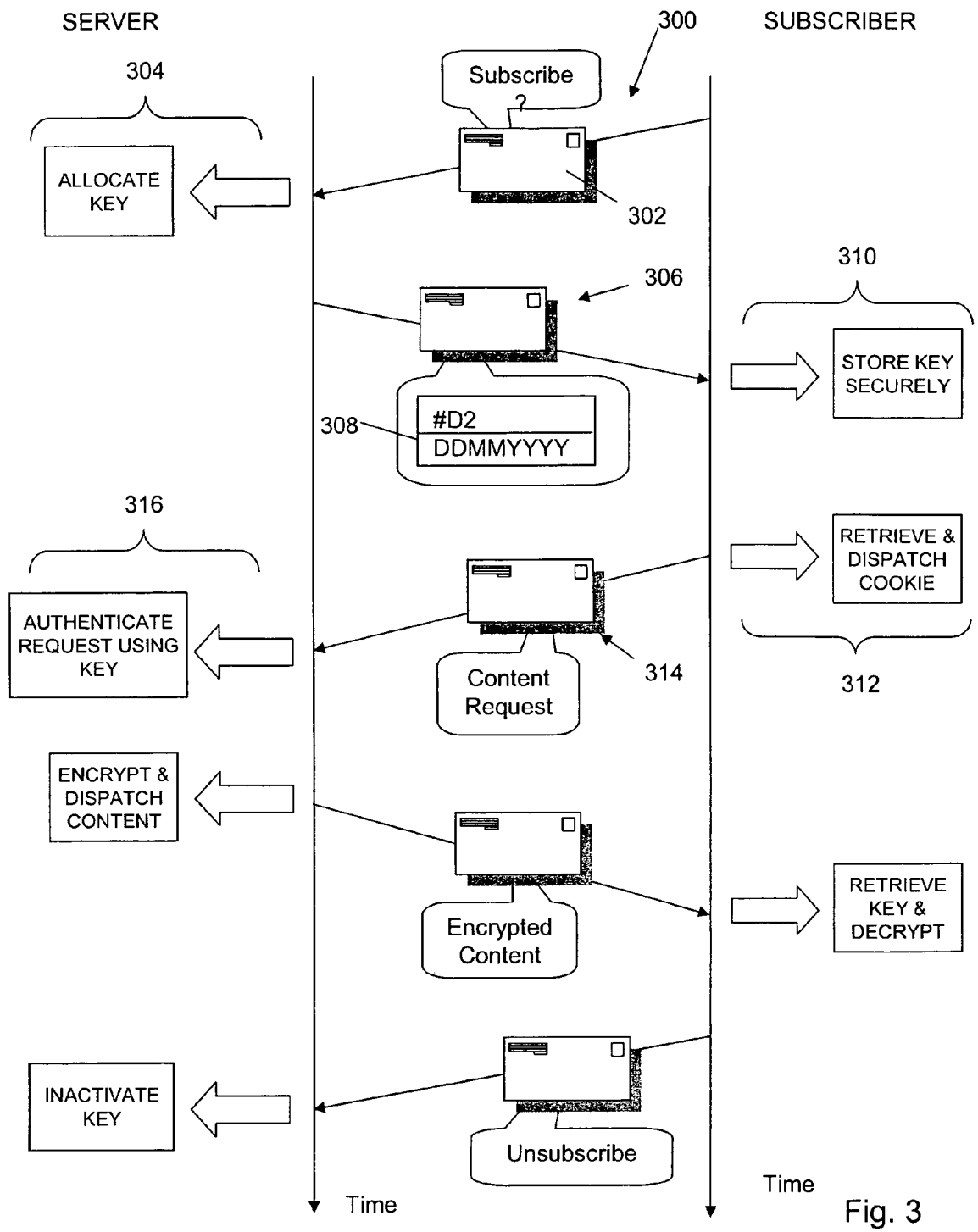
FIG. 3 is a schematic illustration of a process of requesting a key and then using the key to retrieve secure content.

The use of a key in the process of distributing secure content to a subscriber will now be described briefly with reference to FIG. 3. The process is initiated by transaction 300 with receipt by the subscriber of a request 302 for a subscription from a would-be subscriber. The request at this stage is likely to include some form of payment, or promise to pay. Given the need for anonymity of subscribers, the processing of any payment at the server is likely to be dealt with first, and successful payment processing will simply yield an indication to the key management program 110 that the requesting subscriber is entitled to a given level of content provision, e.g., "GOLD" for a given period of time. The key management program then allocates a key to the requesting subscriber at operation 304, and this key is sent back to the subscriber at transaction 306 as part of a cookie 308, which includes the key, here represented as #D2, and a time to live DDMMYYYY for this key, this being the date when the subscription paid for in the payment step expires. It should be noted as this point that, unlike the majority of cookies usually passed to clients from servers, in the present example the cookie 308 does not given any indication of the identity of the requesting subscriber, and other than during the payment process, which is performed entirely separately in the key allocation process, no data identifying the subscriber has been received by the server. In a modification, payment may be made by the subscriber to a trusted third party, who, once payment has been made, then simply passes data indicating the manner in which the client may be contacted to the server for the allocation of a key to that subscriber. Upon receipt of the key #D2, the subscriber then stores this key securely at operation 310. When the subscriber then wants to gain access to the content 100 in respect of which they have subscribed, the cookie 308 containing the key #D2 is retrieved at operation 312 and sent together with a request to access the content in transaction 314. When such a request is received, the server extracts the key #D2 from the cookie, and using the key #D2 authenticates the request at operation 316.

The process of authentication does not include any process in which the key submitted by the subscriber is mapped to an identity for them, since this would inherently compromise their anonymity. Rather, the process simply involves determining whether the key is a genuine key (i.e. one generated from the tree), and whether the level of content (for example, as mentioned above, hourly update rather than daily, for example) indicated within by the key corresponds to that being requested by the user. Thus, presentation of an authenticated key is per se verification of entitlement to the content, meaning that responsibility for secure retention of the key is entirely the subscriber's, since a key appropriated from the subscriber by an unscrupulous third party would enable that third party to gain access to the content. A further consequence is that the subscriber bears the entire burden of responsibility for the protection of their anonymity vis-à-vis their subscription to the content, in that by gaining access to their machine, it is possible to ascertain their identity, and a mapping of their identity to their key exists implicitly on their machine since this is where the key is stored.

The specific process of authentication involves firstly location of the key #D2 within the tree of FIG. 2. As mentioned above, each key includes an indication of its address within the tree in the form of a path from the root key A0, so that in the present example, the key #D2 will implicitly contain data indicative of the path A0-B1-D2. Once the node or address D2 within the tree has been located, the key #D2 is simply matched with the key at that address, and if they are the same then the key #D2 is assumed to be genuine. Authentication of the level of content provision may be performed in a number of ways. In one embodiment a mapping is made of each key issued from tree to the level of content provision for which the subscriber has paid, so that upon receipt and authentication of the key, the authenticated key is then mapped to the content level, and the content level indicated by this mapping is matched with the requested content level. If both the key and the requested content level are authenticated at operation 316, the server then retrieves the requested content and encrypts it with the subscriber's key at operation 317, before dispatching the encrypted content to the subscriber at transaction 318. The subscriber then retrieves their key from secure storage, and uses the key to decrypt the content at operation 320. If, at some later stage, the subscriber no longer wishes to subscribe, they may request cancellation of their subscription at transaction 322, and following receipt of such a cancellation request, the server inactivates the key to prevent the now-cancelled subscriber from gaining access to the content without paying for it.

The above description of both the tree method of generating such keys, and the simplified scenario of the use of a key thus generated is both simplified and incomplete (as mentioned above a fuller explanation of this being provided in the document referenced by Wallner et al), and serves merely to provide sufficient information for an understanding of the context of the present invention, which, in imprecise terms, may be thought of as relating to the management of key allocation and maintenance in a commercial context.

A first aspect of the present invention relates to the management of keys in the event that a subscriber (or put in more general terms, an eligible or bona fide user) becomes ineligible, for example as a result of cancellation of a subscription (whether this is an active event, or by virtue of an existing subscriber failing to renew or pay for the next periodic subscription). Referring, again to FIG. 2, when a subscriber to whom key K4 (this key being an allocated key as indicated by the square around it has been) has been allocated wishes to cancel their subscription, inactivation of their key has a number of consequences. For example, if the same subscriber subsequently wishes to renew their subscription shortly after cancelling it (for example in the event that they forgot to pay, or were late paying due to financial constraints), a new key will have to be issued to them. Given that the tree has only a finite number of keys, cancellation and reissue of a new key to the same subscriber will reduce by two the number of keys available for use. The ultimate consequence of this is that eventually, all allocatable keys within the tree are used up, a new tree will have to be generated, and new keys reissued to existing subscribers. This is both expensive for the provider, and irksome for the subscribers.

Furthermore, and notwithstanding this, invalidation of any key results in a need for at least a degree of reconfiguration of any other key, to the extent it shares any of its ancestors, and then transmission of such reconfigured keys to the subscribers to which such keys have been allocated. More specifically, keys which only share root key A0 as an ancestor will require only one reconfiguration (and corresponding transmission of such a reconfigured key), while those sharing two generations of ancestor require two reconfigurations and therefore two transmissions of reconfigured keys, and so on. It is thus readily apparent that invalidating any key has far reaching consequences. In the specific example of Key K4, its ancestral path is F3-C2-B1-A0, and so it shares:

ancestral keys: F3, C2, B1 and A0 with key L4, which therefore must have all four reconfigured keys redistributed to it for its (i.e. L4's) complete reconfiguration;

ancestral keys C2, B1 and A0 with keys I4, L4 and E3 each of which must therefore receive configured keys for keys C2, B1 and A0;

ancestral keys B1 and A0 with keys D2, G3, H3, and M4 to P4, each of which must therefore receive reconfigured keys for keys B1 and A0;

root key with all the remaining keys, all of which must therefore receive reconfigured root keys.

In addition to this cost, and as referenced above, the allocation of any key to a subscriber has an opportunity cost associated with it, in the form of the number of descendant keys which are redundant as result; the higher the generation of the allocated key, the greater the opportunity cost. Cancellation of a key may thus also be thought of as realising the associated opportunity cost: for example cancelling key #D2 amounts to cancellation of a total of seven keys (from node D2 and its six descendant keys), which in the (unrealistic) illustrated example constitutes a significant proportion of the total number of keys in the tree. Conventional thinking provides that the timing of the cancellation of a subscription in the commercial sense is to be treated as an event which requires corresponding action to be taken from a computational perspective; once a subscription has lapsed the key providing them with access to the material to which the subscription relates must be invalidated forthwith—either by the impregnation of a "time to live" element within the key at its allocation, and/or by means of other steps. One aspect of the present invention is based upon a re-appraisal or perhaps more appositely a re-appreciation of the commercial imperative underlying the reason for issuing (for example) content in secured form, viz to protect the economic value of the content to the provider by limiting the supply to subscribers. While it follows from this premise that in macroscopic terms every action taken by the provider which makes the content more readily available at a lower cost (or no cost at all) will dilute the economic value of that content, since no one will be willing to pay for something which can be obtained free of charge, relatively minor violations of the premise that content is only provided where a valid subscription is in force may yield a net economic benefit to the provider. For example in a case where the economic dilution is small (say one subscription has been in a lapsed state for less than a week), but the consequences of an unyielding application of the principle will result in a large economic penalty to the provider (for example invalidation of a key constitutes a significant contribution to the need to rebuild the tree ab initio).

Referring once again to FIG. 2, consider a scenario where the subscription for the key of node D2 has just lapsed. The opportunity cost of invalidating the key of node D2 is, as mentioned above, a total of seven keys, which is fractionally less than 20% of the total number of keys in the tree. The cost of invalidation of the key #D2 can thus be justifiably be quantified as approximately 20% of the cost of providing a new tree (including the distribution of new keys to existing subscribers). However, this assessment is based on the absolute cost as a proportion of a new tree, but if a significant number p of total available keys N of a new tree have already been invalidated, then as a proportion of the remaining keys the opportunity cost is that much greater, i.e., $0.2N/[N-p]$. To be added to this is the cost of reconfiguration of at least a part of all the other keys in tree to the extent that they share ancestral keys with key #D2, and distribution of these reconfigured key elements to their subscribers.

Balanced against this cost to the provider, is the economic loss they will suffer as a consequence of failing in fact to cancel the subscription by invalidating the key #D2. Elements contributing to this loss include the contribution to the total cost of providing the necessary network and server capacity, the economic effect of dilution of content value (including the potential exploitation of any leniency exhibited by the provider to late payment, for example), but zero marginal cost with regard to the creation or storage of the content, since both these operations must be conducted regardless. It is thus possible to create a policy in which all of these factors are taken into account, suitably weighted to reflect the specific circumstances (or indeed personal preferences) of the provider, so that on each occasion a quantitatively based decision may be made with regard to the invalidation of a key may be made.

One such policy provides for a continual decision making process on each occasion that a subscription lapses, and which takes into account the aggregated lapsed subscriptions at that instant in time to establish whether the costs a provider will incur as a result of invalidating a given subscriber's key are greater than costs to the provider of maintaining an unpaid-for service for all lapsed subscribers whose key are not invalidated at that instant in time; when the latter becomes greater than the former, all outstanding keys for lapsed subscriptions are invalidated. The manner in which this policy operates is shown in more detail below.

1. The Cost to the Provider of Maintaining an Unpaid-for Service to Lapsed Subscribers:

Economic Dilution Cost ($E_c$)+Cost of Network Capacity ($N_c$)

The Network Capacity Cost is a widely varying cost which depends greatly upon the nature of the service provided. Thus for example in the case of content for which a high service level subscription has previously been paid, the content may include video streaming and other high data-rate transmission content items, in which case the cost of providing the content service is likely to be relatively high, whereas low level content service is relatively inexpensive to provide. As with other costs, the true cost to the provider is the aggregated cost due to all instant lapsed subscribers.

The network capacity cost can be quantified as follows:

$$\Sigma_{i=1,j}(n/w\ useage_i)\times(ServerRate_i+NetworkRate_i)$$

where: j is the contemporaneous number of lapsed subscribers;

n/w useage is the average number of bits per second a user i consumes per unit time; and ServerRate and NetworkRate are the charging rates for server and network capacity (in terms of bits per second processes or transmitted respectively) per unit time.

The Economic Dilution Cost is quantified as follows:

$$\Sigma_{i=1,j}[Xt_i \times R \times P_i(ForceResub)] - [P_i(Xt) \times P_i(VolResub) \times R]$$

where: $Xt_i$ is the extra time which a subscriber i will enjoy for free as a result of failing to invalidate their key;

R is the subscription Rate per unit time;

$P_i(ForceResub)$ is the probability that a subscriber i will re-subscribe as soon as they are forced to do so by invalidation of their key;

$P_i(Xt)$ is the probability of the subscriber receiving extra time—i.e. whether the tree will be rebuilt before the subscriber gets extra time;

$P_i(VolResub)$ is the probability that subscriber i will re-subscribe voluntarily as a result of being given extra time.

Thus the expression:

$$[Xt_i \times R \times P_i(ForceResub)]$$

represents the amount of money which is lost due to failing to force a lapsed subscriber to re-subscribe immediately, and the expression:

$$[P_i(Xt) \times P_i(\text{VolResub}) \times R]$$

represents the amount of money which is gained by a lapsed subscriber re-subscribing as a result of the liberal attitude to their lapsed subscription.

2. Cost of Invalidating Lapsed Customer's Key

This is equal to:

Consequential Cost of breach of existing Sevice Level Agreements ($SLA_{cost}$) as a result of having to reissue keys+Cost of loss of consequentially disaffected customers ($POC_{cost}$) as result of key reissue+Key generation costs $$SLA_{cost} = P(OoS) \times \text{NoSubscribers} \times \text{PenaltyCost}$$

Where: P(OoS) is the probability of key redistribution causing the service to drop below agreed levels (e.g. in the case of news service, updates less frequently than have been agreed);
NoSubscribers is the total number of current subscribers;
PenaltyCost is the cost for each subscriber of the service dropping below the agreed levels.

$$POC_{cost} = P(\text{depart}) \times \text{NoSubscribers} \times \text{SubscriberLifetimeValue}$$

where: P(depart) is the probability a customer will cancel their subscription as a result of the inconvenience of key regeneration;
NoSubscribers is the total Number of subscribers
SubscriberLifetimeValue is the estimated future revenue each subscriber will yield to the provider NB in the case of each of $SLA_{cost}$ and $POC_{cost}$ the parameters given above are for average values. More accurate calculations can take individual values into account by summation if desired.

$$KEY_{costs} = [KeyR/genCost_i \times DistCost_i] + [P(T/TreeR/gen) \times DistCost_{T/Tree}]$$

where: $KeyR/genCost_i$ is the cost of regenerating a key for a subscriber i;
$DistCost_i$ is the cost of distribution necessary when regenerating a key for subscriber i;
P(T/TreeR/gen) is the probability of the invalidation of a key causing the need to regenerate the entire tree;
$DistCost_{T/Tree}$ is the cost of distributing keys to all subscribers upon regeneration of the tree.

Where probabilities have been used in these calculations, typically they are probabilities which are obtained empirically from historical data.

As referenced briefly above, one important aspect of this policy is that on each occasion a subscription lapses, the policy is applied to determine for that individual subscription, whether it is economically advantageous to invalidate the key of that subscriber. In this connection it should be noted that the potential costs of failing to invalidate the key of that subscriber are calculated by aggregating the cost of maintaining unpaid-for service to all lapsed subscribers whose keys have not been invalidated, and this aggregated cost is compared with the cost of invalidating the individual key under consideration. In the event that the individual key is invalidated, the still-current keys of other lapsed subscribers are not however invalidated. For this reason a preferred feature of this policy is the periodic re-calculation in accordance with the policy of for each still-current key, since the same calculation performed subsequently may well yield a different result in view of subsequent events. For example, in a situation where the key of the first of ten lapsed subscribers was not invalidated when the policy was first applied, this may have been because the aggregated contribution to the cost of maintaining unpaid-for service to the other nine lapsed subscribers was not taken into account (because temporally their subscription lapsed subsequently, and so these costs were not present at that time); a subsequent recalculation may therefore yield a different result.

Eventually, notwithstanding the ameliorative effects of the policy elucidated above, the tree will have to be rebuilt in its entirety. A further independent aspect of the present invention relates to the manner in which keys are allocated from such a tree, and provides that this is performed on the basis of commercial subscriber characteristics. Thus for example, in accordance with one model of policy, a subscriber who has paid in advance for a whole year's subscription is economically valuable to the provider, and so a subscriber who it is desirable to keep happy. It may therefore be economically advantageous to allocate such a customer, and customers of a similar commercial value, keys of a relatively high generation, and from a part of the tree which is not affected by the invalidation of lower generation key and the consequential reconfiguration which must take place beyond the reconfiguration of the root key. Less economically valuable users will be allocated keys from generations and parts of the tree which are increasingly susceptible to increasing reconfiguration as a result of the invalidation of other keys in the tree.

Figure 4:
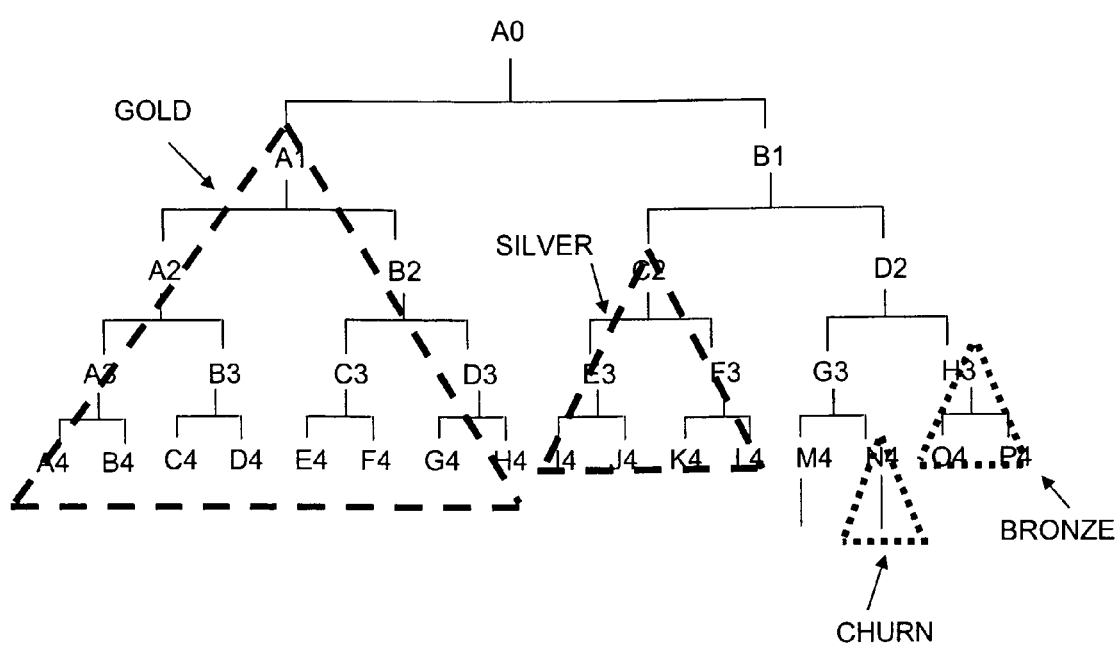
FIG. 4 is a schematic illustration of a further ancestral hierarchy of security keys, and the manner in which domains within which such a hierarchy may be defined to correspond to user groups.

Referring to FIG. 4, a tree similar to that of FIG. 2 is created for existing subscribers following expiry of the useful life of a previous tree. The provider is at this point able to identify amongst his existing subscribers at least the following groups: Gold—these are subscribers to a high level of service, who have a high economic value to the provider, and who have for example paid large subscription fees in advance; Silver—subscribers of a lesser economic value than Gold who are more inclined to cancel their subscription, but nonetheless subscribe to a significant service level; Bronze—largely low service level subscribers who retain valid subscriptions for only a short time period; and Churn—these are subscribers who subscribe for trial periods and/or to the lowest service level. To avoid aggravating the Gold subscribers with unnecessary reconfigurations of their key, these subscribers are allocated keys from a domain provided by one half of the tree structure, which is reserved in its entirety for them. Silver users are allocated keys from a domain provided by a quarter of the illustrated tree structure and in the half of the tree structure not allocated exclusively to Gold subscribers, and this quarter of the tree is likewise allocated exclusively to them. Bronze subscribers are allocated an domain provided by an eighth of the tree structure one generation lower than the silver subscribers, with Churn subscribers being allocated a domain provided by one sixteenth of the tree one generation lower than Bronze users. The consequences of this commercially based architecture in terms of key regeneration are as follows. In the event that a subscription from the Churn domain subscription lapses, all other Churn subscribers will have to have at least keys G3, D2, B1 and A0 reconfigured. Keys in the Bronze domain will require reconfiguration of keys D2, B1 and A0; keys in the Silver domain will require reconfiguration of keys B1 and A0, while keys in the Gold domain will require configuration of key A0. It follows that the consequences of frequent lapses in subscription amongst the most fluid group of subscribers in terms of key regeneration will fall most heavily upon them, since other subscribers of this group will share most ancestral keys, and will therefore need the largest number of key reconfigurations. By contrast, because Gold subscriber's keys are from a domain another half of the tree entirely, which is exclusively reserved for them, any lapsed subscription which occurs in the other half of the tree will only ever require Gold subscribers to reconfigure the root key A0.

In an alternative application of this architecture, a different commercial perspective may yield an opposite outcome. For example, where a group of subscribers have paid a long term subscription, or are contractually bound to such a subscription, it may be desirable to allocate keys to them from a domain where they will have to undergo frequent key reconfigurations when another subscriber's key is invalidated. This will be inconvenient, but because they are already committed to a long term subscription, will not result in any short to medium term loss of revenue by the provider. Keys from a domain in which subscribers do not suffer the inconvenience of large-scale key reconfigurations (e.g. the domain allocated to Gold subscribers in FIG. 4) may then be reserved for short term subscribers who are more mobile, in an attempt to retain their subscription.

In a further aspect of the present invention a decision can be made by the provider on the basis of policy whether to secure content to a subscriber at all. For example, in a situation where a subscriber has committed only to a trial subscription period, and to only a low level of content with a relatively short commercial life (e.g. in the case of a news service, where contemporaneous content is the sine qua non of the service), it may be the case that the risk and potential consequences of misappropriation of the content provided to this user by third parties are such that it is not commercially worth cost, in terms of key allocation and management, of securing the content at all, and so no key is issued. In such a situation the user will most preferably be unaware of this and a placebo key issued to the user will simply identify to the provider that no authentication is required prior to provider the level of content specified therein.

The invention claimed is:

1. A method of managing security keys provided to users of a service, the method comprising the steps of:
   issuing a security key to a first user eligible to receive the service;
   monitoring the first user's status to establish whether the first user is eligible to receive the service;
   establishing, in accordance with a policy, a first value associated with invalidation of the first user's security key at a particular point in time, and a second value associated with providing the service to an ineligible user at the particular point in time, and if the second value exceeds the first value, invalidating the first user's security key at the particular point in time,
   wherein the first user's security key is kept valid if the second value does not exceed the first value, and
   wherein the policy provides that the second value is related to the economic penalty associated with provision of the service to the ineligible user.

2. A method according to claim 1 wherein the policy further provides that the first value is related to the economic penalty associated with reconfiguration of security keys issued to other users consequent to invalidation of the first user's security key.

3. A method according to claim 1 wherein the second value is calculated by aggregating the economic penalty associated with provision of the service to each ineligible user.

4. A method according to claim 3 wherein the economic penalty associated with provision of service to ineligible users includes a value representative of dilution of economic value to eligible users consequent to provision of the service to ineligible users.

5. A method according to claim 1 wherein the economic penalty of providing the service to ineligible users includes any costs arising from the provision of network and server capacity to ineligible users.

6. A method according to claim 2 wherein the security keys are generated in an ancestrally-based hierarchy, and wherein invalidation of a given key necessitates a need for reconfiguration of each security key in the hierarchy.

7. A method according to claim 6 wherein upon invalidation of a given security key, an other security key requires reconfiguration only to the extent that it shares common ancestor security keys with the given invalidated security key.

8. A method according to claim 7 wherein the hierarchy is a binary tree.

9. A method of managing provision of security keys to a plurality of users of a network service, the method comprising the steps of:
   generating a plurality of security keys, each of which is related ancestrally to at least one other security key of the plurality of security keys;
   issuing security keys to users;
   monitoring users' status for continuing eligibility for consumption of the service; and
   upon establishing ineligibility of a user, determining upon the basis of a predetermined policy, a value for economic disbenefit to a provider of the service of (a) invalidation of the ineligible user's security key; and (b) provision of service to an ineligible user.

10. A method according to claim 9 further comprising the step of invalidating the security key if the disbenefit of providing service to an ineligible user is greater than the disbenefit of invalidating the security key.

11. A method according to claim 10 further comprising the step of aggregating the disbenefit of providing the service to each ineligible user, and invalidating the security key only if the aggregated disbenefit of providing the service to all ineligible users is greater than the disbenefit of invalidating the security key.

12. A method according to claim 9 wherein invalidation of the security key necessitates reconfiguration of each other security key to the extent another security key shares common ancestry with the invalidated security key.

13. A method according to claim 8, further comprising the step of:
   assigning security keys to users based on a length of time subscribed to for the service,
   wherein a first set of users who have subscribed for a length of time less than a predetermined time are assigned security keys in a first subsection of the binary tree,
   wherein a second set of users who have subscribed for a length of time greater than or equal to the predetermined time are assigned security keys in a second subsection of the binary tree, and
   wherein the security keys of the first subsection of the binary tree only share a first generation root key as a common ancestor with the security keys of the second subsection of the binary tree.

14. A method according to claim 12, wherein the related ancestry of the security keys is determined by way of a binary tree in which the security keys are assigned,
   wherein the issuing step comprises the step of:
   assigning security keys to the users based on a length of time subscribed to for the service, wherein a first set of users who have subscribed for a length of time less than a predetermined time are assigned security keys in a first subsection of the binary tree, wherein a second set of users who have subscribed for a length of time greater than or equal to the predetermined time are assigned security keys in a second subsection of the binary tree, and wherein the security keys of the first subsection of the binary tree only share a first generation root key as a common ancestor with the security keys of the second subsection of the binary tree.

15. A method according to claim 3, wherein the security keys are generated in an ancestry-based, binary tree hierarchy, wherein invalidation of a given key necessitates a need for reconfiguration of each key in the hierarchy, wherein the first value is computed by adding a first cost associated with invalidating all security keys of the ineligible users, with a second cost associated with reconfiguring all security keys of eligible users that are in an ancestry chain of any one of the security keys of the ineligible users.

16. A method according to claim 9, wherein the security keys are generated in an ancestry-based, binary tree hierarchy, wherein invalidation of a given key necessitates a need for reconfiguration of each key in the hierarchy, wherein the value for economic disbenefit to the provider is computed by adding a first cost associated with invalidating the ineligible user's security key, with a second cost associated with reconfiguring all security keys of eligible users that are in an upper ancestry level in a same ancestry chain as the ineligible user's security key, and with a third cost associated with invalidating all security keys in the binary tree hierarchy that are of a lower ancestry level in the same ancestry chain as the ineligible user's security key.

17. A method according to claim 1, wherein the issuing step is performed by a server, and wherein the issuing step includes providing the security key to the first user in a cookie returned to the first user by the server over the Internet.

18. A method according to claim 9, wherein the issuing step is performed by a server, and wherein the issuing step includes providing the security keys to the users in cookies respectively returned to the users by the server over the Internet.

19. A method according to claim 16, wherein the second cost includes a cost associated with creating a new binary tree to provide a new set of security keys to replace all invalidated security keys.

20. A method according to claim 16, wherein the third cost includes a cost associated with creating a new binary tree to provide a new set of security keys to replace all invalidated security keys.

* * * * *